United States Patent
Maners et al.

(10) Patent No.: US 10,451,169 B2
(45) Date of Patent: *Oct. 22, 2019

(54) DUAL SPLINED SHAFT

(71) Applicant: Rolls-Royce Corporation, Indianapolis, IN (US)

(72) Inventors: Brian Scott Maners, Indianapolis, IN (US); David Russell Bockmiller, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 351 days.

This patent is subject to a terminal disclaimer.

(21) Appl. No.: 15/610,021

(22) Filed: May 31, 2017

(65) Prior Publication Data
US 2017/0261090 A1    Sep. 14, 2017

Related U.S. Application Data

(63) Continuation of application No. 12/316,782, filed on Dec. 16, 2008, now Pat. No. 9,677,662.

(60) Provisional application No. 61/008,357, filed on Dec. 20, 2007.

(51) Int. Cl.
*F16H 57/04* (2010.01)
*F16D 1/10* (2006.01)

(52) U.S. Cl.
CPC ..... *F16H 57/043* (2013.01); *F16D 2001/103* (2013.01); *F16D 2300/06* (2013.01)

(58) Field of Classification Search
CPC ............... F16H 57/043; F16H 57/0427; F16H 57/0456; F01D 25/18; F16D 2001/103; F16D 2300/06; F16N 7/363; F16N 9/02

USPC ........... 184/7.4, 6, 6.11, 6.12; 464/7, 16, 17
See application file for complete search history.

(56) References Cited

U.S. PATENT DOCUMENTS

| | | | | |
|---|---|---|---|---|
| 3,242,695 A | * | 3/1966 | Ross, Jr. | F16D 3/06 184/45.1 |
| 3,380,555 A | * | 4/1968 | Myers | B60R 17/00 184/6.12 |
| 3,577,746 A | * | 5/1971 | Dolan | F16D 3/06 464/16 |
| 3,589,471 A | * | 6/1971 | Edge | F01D 25/18 184/6 |
| 3,621,937 A | * | 11/1971 | Edge | F01D 25/18 464/16 |
| 3,889,489 A | * | 6/1975 | Casey | F16D 3/06 464/16 |
| 4,004,433 A | * | 1/1977 | Calistrat | F16D 3/185 464/16 |
| 4,013,141 A | * | 3/1977 | James | F16N 7/363 184/6.11 |

(Continued)

*Primary Examiner* — William E Dondero
*Assistant Examiner* — Robert T Reese
(74) *Attorney, Agent, or Firm* — Duane Morris LLP

(57) ABSTRACT

The present disclosure provides a lubricating system for a dual splined hollow shaft. A fluid dam is formed circumferentially within the hollow shaft to control the lubrication of the dual splines. The fluid dam includes a pair of sidewalls extending radially inward from the inner wall of the hollow shaft to a height defined by a top wait. A channel formed through the pair of sidewalls permits the movement of lubricant between splines of the hollow shaft. An egress port extends from the top wall of the dam through the outer wall of the hollow shaft to permit lubricant to exit the hollow shaft.

20 Claims, 4 Drawing Sheets

(56) References Cited

U.S. PATENT DOCUMENTS

| | | | | |
|---|---|---|---|---|
| 4,026,386 A * | 5/1977 | Therkildsen | ............ | F01M 1/06 |
| | | | | 184/6 |
| 4,461,376 A * | 7/1984 | Lech, Jr. | ................ | F16D 3/12 |
| | | | | 192/206 |
| 4,771,864 A * | 9/1988 | Lorimor | .................. | F16D 3/06 |
| | | | | 184/6 |
| 4,858,427 A * | 8/1989 | Provenzano | ............ | F01D 25/18 |
| | | | | 60/39.08 |
| 5,033,585 A * | 7/1991 | Mangas | ................. | F01D 25/18 |
| | | | | 184/6.12 |
| 5,119,905 A * | 6/1992 | Murray | .................. | F01D 25/18 |
| | | | | 184/6.11 |
| 6,098,753 A * | 8/2000 | Lamarre | ................ | F01D 25/18 |
| | | | | 184/6.11 |
| 7,285,052 B1 * | 10/2007 | Rowell | ................... | F16C 3/02 |
| | | | | 464/183 |
| 7,322,579 B2 * | 1/2008 | Riley | ...................... | F16C 3/03 |
| | | | | 277/372 |
| 7,491,127 B2 * | 2/2009 | Bristol | .................... | F16D 3/06 |
| | | | | 403/359.6 |
| 9,677,662 B2 * | 6/2017 | Maners | ................ | F16H 57/043 |
| 2008/0196975 A1 * | 8/2008 | Fujita | ...................... | B60K 6/26 |
| | | | | 184/6.12 |
| 2009/0159370 A1 * | 6/2009 | Maners | ................ | F16H 57/043 |
| | | | | 184/6.12 |

\* cited by examiner

DUAL SPLINED SHAFT

CROSS REFERENCE TO RELATED APPLICATIONS

This application is a continuation application of and claims priority to U.S. patent application Ser. No. 12/316,782 filed Dec. 16, 2008, now U.S. Pat. No. 9,677,662, which claims priority to U.S. Provisional Patent Application No. 61/008,357 filed Dec. 20, 2007. The entirety of these applications are hereby incorporated by reference.

GOVERNMENT RIGHTS

The present application was made with the United States government support under Contract No. N000904C-0093 awarded by the U.S. Navy. The United States government has certain rights in the present application.

FIELD OF THE INVENTION

The present invention relates to a dual splined shaft and more particularly to a lubrication system for the same.

Rotatable shafts can be coupled to gears or other shafts via a spline interface. The spline interface must be lubricated appropriately to prevent wear or galling due to fretting, vibratory loading, or other loading causing wear on the spline teeth. It is desirable to deliver enough lubrication to adequately protect the spline interface, but prevent excessive lubrication. Over lubrication requires additional pumping and storage capacity in the lubricant system, which increases system cost, creates weight penalties, and causes additional space claim requirements.

Dual splined shafts create additional challenges over single spline shafts. Because each spline must be lubricated, the splines must either have separate lubrication delivery systems or a single system must be able to deliver adequate lubrication to both ends of the shaft. Dual lubrication systems are expensive due to the redundancy and single systems tend to either over or under lubricate at least one of the splines.

One method of single source lubrication is to provide an opening in the wall of a partially hollow shaft and spray lubricating fluid toward the opening. One drawback to this type of system is that a significant amount of the lubrication will not pass through the opening because the shaft is rotating. The bigger the opening the more likely the lubricant will enter the hollow shaft but the large opening makes it more likely that the lubricant will exit back out of the hollow shaft before moving to lubricate either of the splines. Furthermore the size of the opening is limited by the geometry of the shaft and the associated mechanical stress induced in a load bearing wall because of the large opening. If the opening is too small more lubricant is "wasted" as it hits the outer wall of the shaft and fails to enter through the opening as the shaft rotates. The present inventions provide novel and non-obvious, innovation needed in this field of technology.

The present invention includes an apparatus and method for lubricating a dual splined shaft. Further embodiments, forms, features, aspects, benefits, and advantages shall become apparent from the description and figures provided herewith.

BRIEF DESCRIPTION OF THE DRAWINGS

The description herein makes reference to the accompanying drawings wherein like reference numerals refer to like features throughout the several views, and wherein.

DETAILED DESCRIPTION

Figure 1:
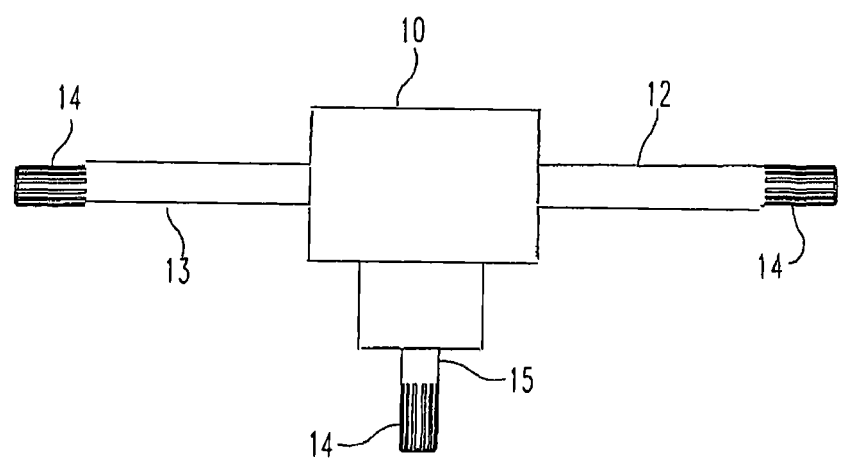
FIG. 1 is schematic top view of a gear box having a plurality of splined shafts projecting therefrom.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The inventions disclosed herein includes means for lubricating a dual splined shaft i.e. a shaft having splines on opposing ends thereof. The dual splined shaft can be coupled to input/output shafts or other rotating components having mating spline connections. While the disclosed embodiment depicts female couplings or internal splined couplings on the dual splined shaft, it should be readily understood by one skilled in the art that male couplings or external splined couplings could be implemented on the dual splined shaft. Furthermore the dual splined shaft may have a combination of both a male spline and a female spline. The lubrication system including any nozzles and spray geometry may be modified to utilize a dual splined shaft with a male coupling without departing from the teachings of the present invention.

The dual splined shaft of the present invention is substantially hollow to permit lubrication fluid or lubricant to move freely between opposing ends of the shaft. One aspect provides for a shaft design with desired lubrication at the opposing coupling ends while minimizing the volume and dwell time of the lubricant within the hollow shaft if the volume or dwell time of the lubricant in the dual splined shaft is more than the required amount then the lubrication system will not be optimized. This non-optimization requires larger volume oil sumps and higher capacity pumps which in turn leads to space claim and weight penalties—all which translates into higher system costs. The present invention ensures that both splines are adequately lubricated and that lubricant is expelled at a desired rate to prevent excess lubricant from building up within the hollow shaft.

For purposes of this disclosure lubricating fluid can include any common or non-common lubricant known to those skilled in the art. In one example the fluid can be a carbon based mineral oil, in another example the fluid can be a synthetically produced lubricant, and in other examples the fluid can combinations of natural made lubricants and man made lubricants.

Referring to FIG. 1, a schematic representation of a gear housing 10 having a plurality of shafts 12, 13, and 15 extending therefrom is illustrated. Each of the shafts 12, 13, 15 can include a spline coupling 14 on the ends thereof. While a gear housing is illustrated in the example embodiment, it should be understood that the present invention can be utilized with any shafting or gear configuration in which it would be advantageous to use a dual splined shaft. Material selection for the shafts, gears, splines and other rotating components disclosed herein are generally known to those skilled in the art. Materials may include, but are not limited to metals, ceramics, composites, plastics and any combination thereof.

Figure 2:
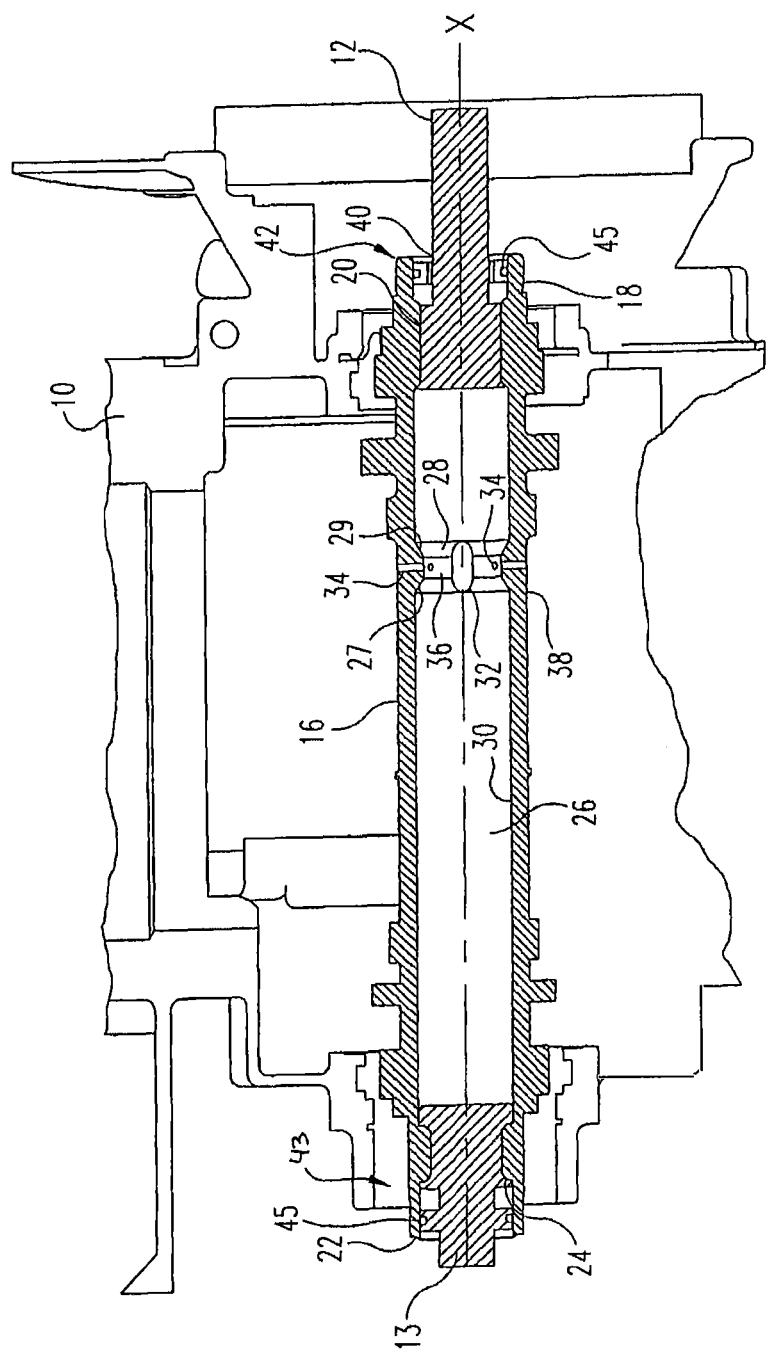
FIG. 2 is a cutaway of the gear box of FIG. 1 showing a cross section of a shaft having dual spline couplings.

Referring now to FIG. 2, the gear housing 10 can have a dual splined shaft 16 operable to transmit rotation or torque between the pair of splined shafts 12, 13. The splined shafts 12, 13 can be input shafts, output shafts or any other rotating component such as gears and the like. The dual splined shaft 16 includes a first end 18 having a first splined coupling 20 and a second end 22 having a second splined coupling 24. The dual splined shaft 18 has a substantially hollow core 26 to permit lubricating fluid to internally travel along the length of the shaft 16 between the first and second spline couplings 20, 24.

The shaft 16 includes a fluid dam 28 protruding radially inward from an inner wall 30. The fluid dam 28 can extend circumferentially around the entire inner wall 30. The fluid dam 28 includes a pair of sidewalls 27, 29 extending radially inward toward a top wall 36. At least one channel 32 extends through the sidewalls 27, 29 and can be positioned at a sufficient depth such that lubricating fluid can flow past the fluid dam 28 through the at least one channel 32. In one form the depth of the channel 32 is substantially flush with the inner wall 30 of the hollow shaft 16. At least one fluid egress port 34 extends from the top wall 38 of the dam 26 through an outer wall 38 of the shaft 16 to permit lubricating fluid to egress out of the dual splined shaft 16.

First and second seal assemblies 42, 43 are positioned adjacent the first and second ends 18, 22, respectively of the shaft 18. The seal assemblies 42, 43 restrict lubrication fluid from exiting the dual splined shaft 18 through the ends thereof. The seal assemblies 42, 43 can include a fluid seal 45 such as an o-ring or the like to seal an interface portion of the inner wall 30 of the dual splined shaft 18 with the coupled shafts 12, 13. The seal assemblies 42, 43 are preferably a single continuous component mounted on the coupled shafts 12, 13 prior to installation, but alternatively embodiments can include multi-piece construction that can be installed after the shafts 12 and 13 are coupled with the dual splined shaft 16 as one skilled in the art would readily understand. The first seal assembly 42 includes at least one ingress port 40 for permitting lubricating fluid to enter into the shaft 16 and lubricate the splined couplings 20, 24. In one non-limiting embodiment the ingress post 40 includes a plurality of elongated slotted apertures formed under the O-ring or seal portion 45 of the seal assembly 42 (best seen in FIG. 3). Because of the centripetal acceleration force due to high speed rotation of the shaft 16, the lubricating fluid will move radially outward toward the inner wall 30 of the shaft 18 and will be restricted from flowing past the seals 45 of the seal assemblies 42, 43.

Figure 3:
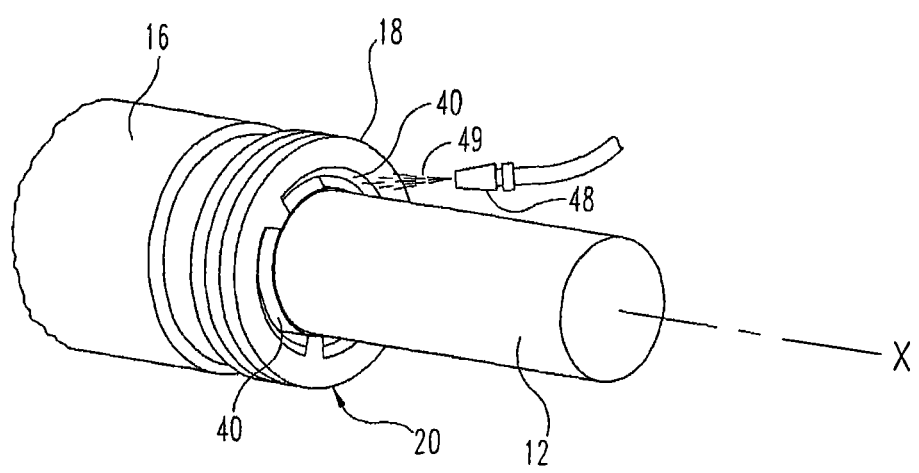
FIG. 3 is an enlarged perspective view of one end of the dual splined shaft with an input/output shaft engaged therewith and a lubrication nozzle spraying lubrication under a spline coupling.
Figure 4:
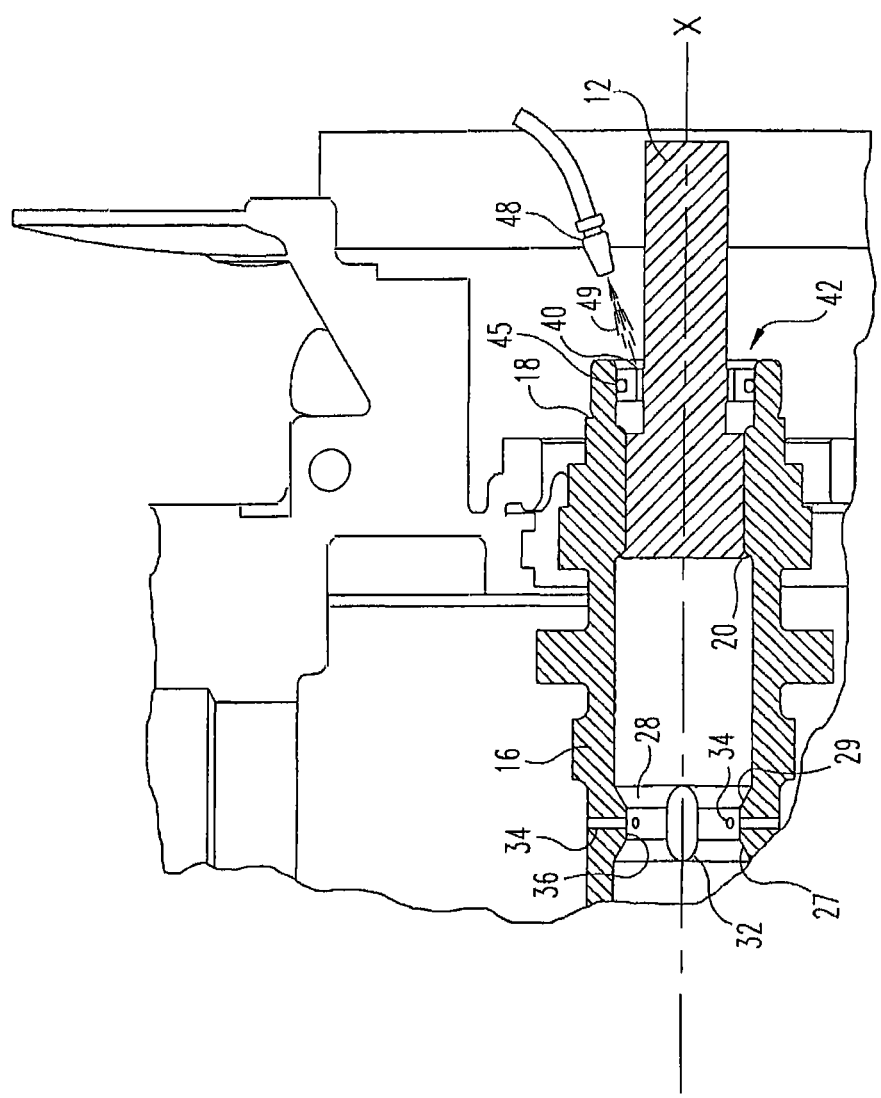
FIG. 4 is a cross sectional view of the splined coupling shown in FIG. 3.

Referring now to FIGS. 3 and 4, the first end 18 of the shaft 16 is illustrated with a nozzle 48 directing a spray 49 of lubricating fluid toward the ingress port 40. The nozzle 48 can spray lubricating fluid substantially in the direction along the axis of rotation X. The lubricating fluid enters through the ingress ports 40 as the dual splined shaft 18 is rotating. The port 40 permits lubricating fluid to pass under the seal 45 of the seal assembly 42 and into the spline coupling 20. The seal 45 of the seal assembly 42 substantially restricts the lubricating fluid from escaping back out through the first end 18 of the shaft 16. The lubricating fluid then flows through the splined coupling 20 connecting the coupled shafts 18 and 12 to one another. After the lubricating fluid passes through and lubricates the splined coupling 20, the lubricating fluid traverses into the hollow portion of the shaft 16.

As described above, because the dual splined shaft 18 rotates at a relatively high speed the lubricating fluid in the hollow portion will move toward the surface of the inner wall 30 (best seen in FIG. 2). As the lubricating fluid continues to flow into the hollow portion of the shaft, the fluid will pass across the dam 28 via the at feast one channel 32. When the hollow shaft 18 is partially filled with lubricating fluid, the fluid will move to the second end 22 and lubricate the second splined coupling 24. The lubricating fluid is prevented from escaping past the coupling 24 at the second end 22 because the seal 45 of the second seal assembly 43 (see FIG. 2) forms a fluid tight connection between dual splined shaft 16 and the coupled shaft 13. The lubricating fluid will continue to build up along the inner wall 30 of the rotating shaft until it rises above the top wall 36 of the dam 28. After the lubricating fluid reaches the height of the top wall 36, any additional fluid entering the hollow shaft 18 will cause the lubricating fluid to exit through the egress ports 34 and flow back to a fluid sump (not shown). During operation, the height of the dam 28 will control the amount of lubricating fluid retained in the hollow shaft 16 and the number and size of the egress ports 34 will control how fast the lubricating fluid is expelled from the hollow shaft 16. At shutdown, lubricating fluid can egress through the inlet ports 40 because the centripetal force has been removed, in this manner both spline couplings 20, 24 of the dual splined shaft 18 will be adequately lubricated and the quantity of lubricating fluid disposed within the hollow shaft 18 is controlled by the dam 28 during operation.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A system for lubricating a dual splined shaft comprising:
   a hollow rotatable shaft having an inner wall and an outer wall and first and second splines associated with opposing ends thereof;
   first and second components connected to the hollow shaft via a spline coupling;
   a first fluid seal assembly positioned at an interface between the first component and the hollow shaft, the first fluid seal assembly including at least one fluid passageway for transporting lubricating fluid to the splined couplings;

a second fluid seal for sealing an interface between the second component and the opposing end of the hollow shaft; and a fluid dam formed within the hollow shaft, the fluid dam having a pair of sidewalls extending radially inward from the inner wall of the hollow shaft to a height defined by a top wall formed between the sidewalls, wherein the fluid dam comprises:

at least one channel formed through the pair of sidewalls, wherein the bottom of the channel is substantially flush with the inner wall of the hollow shaft; and at least one egress port extending from the top wall of the dam through the outer wall of the hollow shaft.

2. The system of claim 1, wherein the fluid dam extends circumferentially around the entire inner wall of the hollow shaft.

3. The system of claim 2, wherein the lubrication fluid flows through the fluid passageway of the seal assembly, passes through and lubricates the first splined coupling, enters into the hollow shaft and traverses though the at least one channel to the opposing end and lubricates the second splined coupling.

4. The system of claim 1, wherein the lubrication fluid fills the hollow shaft to a height of the top wall of the dam and egresses from the hollow shaft through the egress port.

5. The system of claim 1 further comprising:

a lubrication system including a pump and a nozzle for supplying lubrication fluid to the dual splined hollow shaft through the at least one fluid passageway of the first seal assembly.

6. The system of claim 5, wherein the primary direction of the lubricating fluid spray from the nozzle is substantially along the axis of rotation of the hollow shaft.

7. The system of claim 1 wherein the channel is aligned parallel to the axis of rotation of the hollow shaft.

8. The system of claim 7 wherein the side walls are disposed at a non-perpendicular angle to the axis of rotation of the hollow shaft.

9. A method of lubricating a pair of splines of a hollow dual splined shaft having an inner wall and an outer wall comprising the steps of:

delivering lubricant to a splined shaft through a passageway in a seal assembly proximate one end of the shaft;

directing the lubricant through a first splined coupling associated with the shaft;

flowing lubricant into a first end of the hollow shaft;

traversing the lubricant past a dam in the shaft, wherein the traversing step includes flowing the lubrication fluid through a channel formed in the dam, and wherein the bottom of the channel is substantially flush with the inner wall of the hollow shaft;

moving the lubricant to a second end of the hollow shaft;

lubricating a second splined coupling; and ejecting lubricating fluid from the hollow shaft, wherein the ejecting step includes filling the hollow shaft with lubrication fluid up to the height of the dam.

10. The method of claim 9, wherein the ejecting step further includes flowing lubrication through the outlet port formed at a top of the dam.

11. The method of claim 9 further comprising sealing the splined couplings at either end to restrict lubrication fluid from egressing from the hollow shaft through the opposing ends thereof.

12. The method of claim 9, wherein the delivering step includes spraying lubricating fluid in a direction substantially parallel to the axis of rotation of the dual splined shaft.

13. An apparatus comprising:

a hollow rotatable shaft having an inner wall and an outer wall;

first and second splines associated with opposing ends of the shaft;

a fluid dam formed within the hollow shaft, the fluid dam having a pair of sidewalls extending radially inward from the inner wall of the hollow shaft to a height defined by a top wall connecting the sidewalls;

at least one channel formed through the pair of sidewalls, wherein the bottom of the channel is substantially flush with the inner wall of the hollow shaft;

at least one egress port extending from the top wall of the dam through the outer wall of the hollow shaft; and a first splined component connected to the first spline of the hollow shaft.

14. The apparatus of claim 13 further comprising a second splined component connected to the second spline of the hollow shaft.

15. The apparatus of claim 14, wherein the components are one of a gear and a shaft.

16. The apparatus of claim 14 further comprising:

a pair of seal assemblies operably connected between the splined components and the hollow shaft.

17. The apparatus of claim 16, wherein the pair of seal assemblies restrict lubricating fluid from exiting the hollow shaft proximate the ends thereof.

18. The apparatus of claim 16, wherein one seal assembly includes at least one inlet port fluidically connected to the hollow shaft via one of the splines.

19. The apparatus of claim 13, wherein the channel is aligned parallel to the axis of rotation of the hollow shaft.

20. The apparatus of claim 13, wherein the channel is aligned perpendicular to the side walls.

* * * * *